May 27, 1958 A. J. HIRST 2,836,413

INDEPENDENT WHEEL SUSPENSION

Filed March 27, 1953 5 Sheets-Sheet 1

INVENTOR
Archie J. Hirst
By Ralph B. Stewart
Attorney

May 27, 1958 A. J. HIRST 2,836,413
INDEPENDENT WHEEL SUSPENSION
Filed March 27, 1953 5 Sheets-Sheet 2
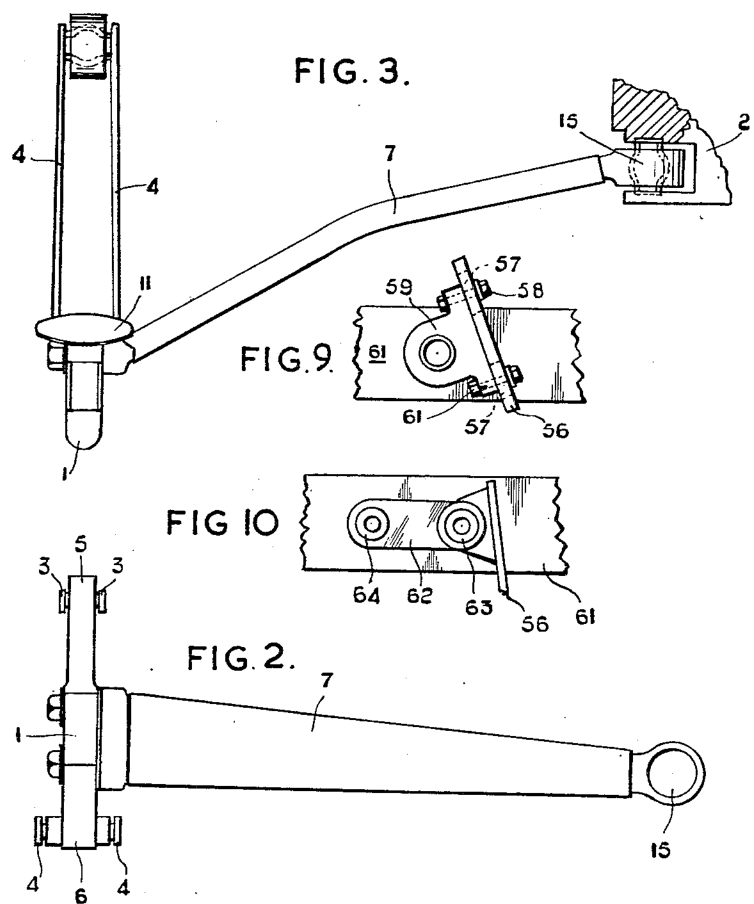
INVENTOR
Archie J. Hirst
By Ralph B. Stewart
attorney INVENTOR
Archie J. Hirst
By Ralph B. Stewart
Attorney May 27, 1958 A. J. HIRST 2,836,413
INDEPENDENT WHEEL SUSPENSION
Filed March 27, 1953 5 Sheets-Sheet 4
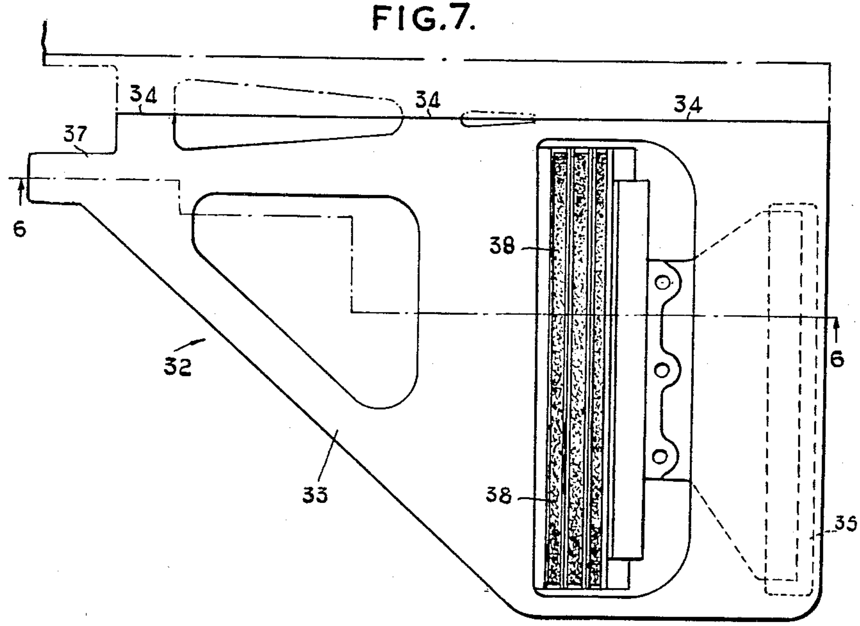
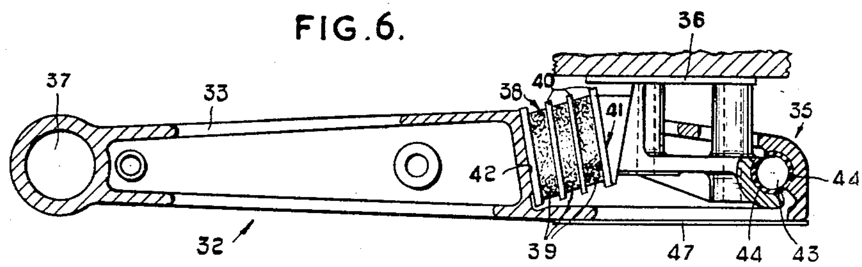
INVENTOR
Archie J. Hirst
By Ralph B. Stewart
Attorney May 27, 1958 A. J. HIRST 2,836,413

INDEPENDENT WHEEL SUSPENSION

Filed March 27, 1953 5 Sheets-Sheet 5

INVENTOR
Archie J. Hirst
By Ralph B. Stewart
Attorney

United States Patent Office 2,836,413 Patented May 27, 1958

2,836,413

INDEPENDENT WHEEL SUSPENSION

Archie John Hirst, Leicester, England, assignor to Metalastik Limited, Leicester, England, a British company Application March 27, 1953, Serial No. 345,131

7 Claims. (Cl. 267—21)

This invention relates to independent suspension of the wheels of vehicles such as motor vehicles, trailers, gun carriages, agricultural machinery and the like.

According to the present invention independent suspension is provided for a vehicle wheel in which a wheel hub carrying member is carried by a linkage which permits and guides deflection of the wheel relative to the superstructure of the vehicle suspended, wherein a rubber sandwich is interposed between mounting plates or abutments on the superstructure and on a part of the linkage movable with respect to the superstructure, the ends of the rubber sandwich being rigidly secured to the respective mounting plates or abutments and the rubber sandwich being so arranged that the relative motion in a vertical plane between its ends in a normal static load position has an instantaneous direction making a small angle with the plane of the mounting plate or abutment on the vehicle superstructure, this small angle and the rigid fixing of the ends ensuring that vertical loads, for example due to the weight of the vehicle, are carried by the rubber in both compression and shear.

As the linkage deflects under vertical loads the abutments approach one another. Because both end plates of the rubber spring are rigidly secured to the abutments this relative motion results in compression of the rubber so that the rubber is loaded in both compression and shear.

The inclination of the end plates and interleaves of the sandwich with respect to the instantaneous direction of relative motion between the end plates largely determines the extent to which load is borne respectively in compression and shear. The geometry of the linkage governing the path which the end of the sandwich mounted on the linkage follows with respect to the end mounted on the superstructure affects the ratio between compression and shear stress at different deflections.

By loading the rubber in both compression and shear within the permissible limits and by suitably arranging the linear and angular dimension of the sandwich and the composition of the rubber the strain energy which can be absorbed by the spring is substantially increased over that which could be absorbed by the spring under shear or compression loading only so that the volume of rubber required is substantially reduced.

The linkage by which the wheel hub carrying member is carried may comprise vertically spaced links each pivotally connected by one end to the wheel hub carrying member and by the other end to the vehicle superstructure. The links may be arranged in various directions for example they may be laterally directed with respect to the longitudinal axis of the vehicle or be leading or trailing longitudinal links or be partly laterally and partly longitudinally directed. The end of the sandwich connected to the linkage may be on one of the links or on the hub carrying member or on a member spanning and pivotally connected to the spaced links but separate from the wheel hub carrying member. In the last two cases the load on the lower link may be arranged to be always in tension. This link may then be designed as a tie which is normally lighter and more simple than a strut.

Alternatively the linkage may comprise an arm which is pivotally connected to the vehicle structure and on which is provided the mounting plate or abutment for the end of the rubber sandwich connected to the linkage.

The invention comprises an independent suspension for a vehicle wheel in which a wheel hub carrying member is carried by a linkage which permits and guides generally vertical deflection of the wheel relative to the superstructure of the vehicle wherein a rubber sandwich is interposed between mounting plates or abutments on the superstructure and on a part of the linkage which on wheel deflection moves with respect to the superstructure, the linkage being so proportioned and arranged that a point on the end of the rubber sandwich secured to the linkage has a curved path with respect to the end secured to the vehicle superstructure such that for deflection above or below an intermediate position the ends of the rubber sandwich approach and the rubber sandwich being so arranged that the ends of the rubber sandwich are inclined at a small angle to the direction of relative motion on the curved path at a normal static load position, above the intermediate position, the inclination of the ends of the rubber sandwich causing vertical loads to be borne by the rubber in both compression and shear and the curved path causing the compressive element of this loading to increase progressively with increase of deflection in each direction.

The progressive increase of the compressive element of the loading on the rubber sandwich gives the suspension an S-shaped load/deflection characteristic and therefore, a variable stiffness which, over a reasonable range of deflection about the normal static load position, enables an approximation of constant periodicity to be obtained while large deflections both in the "bump" and "rebound" directions are adequately resisted so that the use of separate buffers may become unnecessary.

The rubber sandwich preferably comprises rubber blocks interposed between and bonded to end plates, and having interleaves between and bonded to the rubber blocks to increase the stiffness in compression. The end plates are preferably flat and in the free state of the sandwich before assembly in the linkage are parallel and considerably offset by the use of rubber blocks of rhomboidal cross section in a plane perpendicular to the end plates, giving the whole spring a rhomboidal cross section in this plane. The rubber sandwich may be built up from two or more axially aligned rubber sandwich elements each bonded to end plates and with or without interleaves.

The rubber blocks may be circular in cross section or polygonal but where space in the vertical direction is limited—as it frequently is in motor vehicle front wheel suspension, for example—cross section of the sandwich in a plane parallel to the mounting plates is preferably long and narrow and its major dimension is arranged horizontally. This arrangement enables a wheel suspension of low overall height to be produced, simplifying its inclusion in a vehicle superstructure to give adequate ground clearance.

With rubber sandwiches of thickness large in proportion to cross sectional area of the rubber blocks there is a tendency for the interleaves to cant or turn under load so that they are no longer parallel to the end plates. This action may be restrained by providing a constraining arm on at least one of the interleaves or/and between the or any of the rubber sandwich elements and so connecting it to a part of the linkage for example, one or more of the swinging links, or to the superstructure that angular movement of the constraining arm in a vertical plane is resisted.

For a better understanding of the invention embodiments will now be described with reference to the accompanying drawings in which:

Figure 2 is an elevation of part of the linkage in the direction of arrow A of Figure 1.

Figure 3 is a plan view of part of the linkage shown in Figures 1 and 2.

Figure 6 is a sectional elevation, and

Figure 7 is a half-plan of part of another form of independent suspension according to the invention.

Figures 9 and 10 show details of construction.

Figure 1:
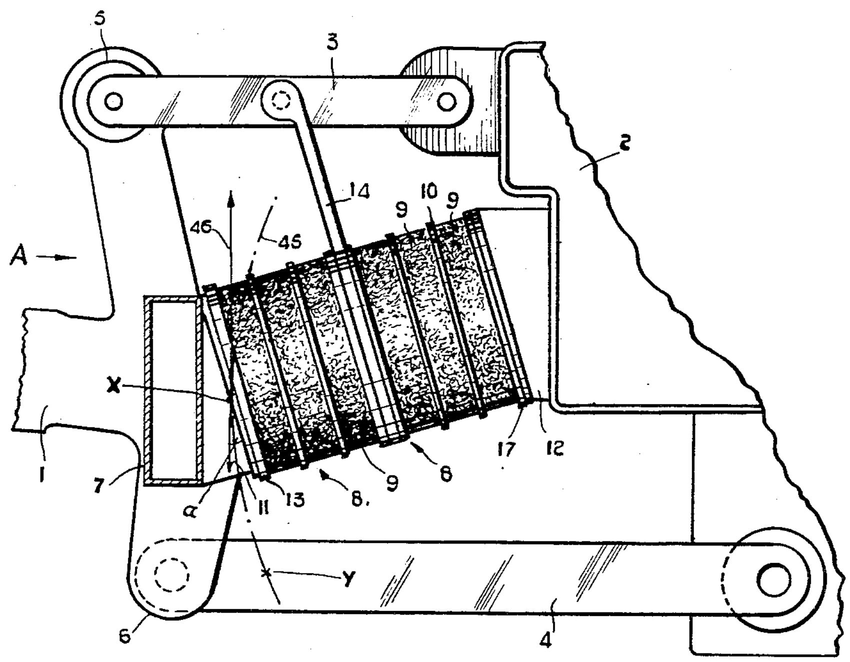
Figure 1 is an elevation of one form of independent suspension according to the invention, viewed from the front of a vehicle upon which it is mounted.

Referring first to the embodiment shown in Figures 1 to 4, a wheel hub carrying member 1 is connected to a vehicle chassis 2 by a pair of upper links 3 and a pair of lower links 4 pivoted at their outer ends respectively to the upper end 5 and the lower end 6 of the hub carrying member 1 and at their inner ends to the vehicle chassis or superstructure 2. A torque arm 7 shown in cross section in Figure 1 is rigidly connected by one end to the hub carrying member and extends forwardly from it (see Figures 2 and 3). The other end of the torque arm 7 is pivoted at 15 to the vehicle chassis 2. A rubber sandwich built up from rubber sandwich elements 8 each comprising alternate rubber blocks 9 and non-resilient interleaves 10 bonded together, is interposed between abutments 11 and 12 respectively on the hub carrying member 1 and the vehicle chassis 2, mounting plates 13 bonded to the ends of the sandwich being secured to the abutments, for example by bolts (not shown). Alternatively they may be rigidly secured by locating means such as ribs or rims engaging the edges of the end plates and preventing lateral movement while initial compression of the sandwich prevents separation of the end plates from the abutments.

Between the adjacent end plates of the rubber sandwich elements 8 a constraining arm 14 is interposed which at its other end is pivotally connected to the upper links 3 in order to restrain the tendency for the interleaves 10 to cant or turn under load out of parallelism with the mounting plates, which without the restraint provided by the constraining arm 14 may cause undesirable tension forces to be set up in parts of the rubber, and in extreme cases the collapse of the spring as an unstable strut.

Figure 11:
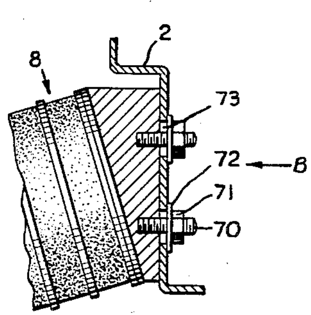
Figure 11 is a fragmentary sectional elevation similar to part of Figure 1 showing further constructional details.
Figure 12:
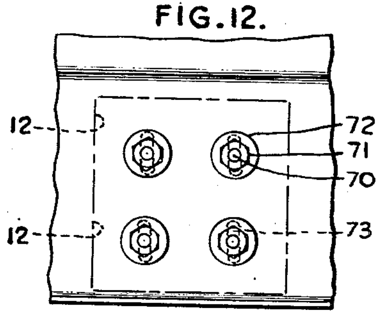
Figure 12 is a fragmentary elevation looking in the direction of the arrow B of Figure 11.

The abutment 12 is in the form of a wedge-shaped block which is vertically adjustable with respect to the chassis 2. This enables the height of the rubber sandwich at that end to be varied and so the angular relationship between the links 3 and 4 and the hub carrying member 1 for a given loading to be altered. One form of adjustment is shown in Figures 11 and 12. The wedge 12 is secured to the vehicle chassis 2 by studs 70 in screw-threaded holes in the wedge 12 and projecting through upright slots 73 in the chassis 2. The slots allow the position of the wedge with respect to the chassis 2 to be adjusted. The projecting ends of the studs 70 are fitted with washers 72 and nuts 71 the tightening of which secures the wedge 12 in the adjusted position. This adjustment may be used for the initial setting of the suspension and for re-adjustment, for example, due to creep of the rubber. When the weight of the vehicle has been taken off the wheels and the constraining arm 14 disconnected from the link 3, provided that adequate adjustment is available, the abutment 12 may be raised sufficiently to remove all load from the rubber sandwich which may then be removed without dismantling the linkage.

A point X on the end of the sandwich element 8 which engages the abutment 11, owing to the geometry of the linkage, has a curved path (indicated by the chain-dotted line 45 in Figure 1) with respect to the end of the rubber sandwich element secured to the abutment 12. The point X is shown in Figure 1 in the normal static load position which may be under tare load, part-load or full load condition according to the type of vehicle and the characteristics required of the suspension. The curved path 45 is such that for deflections of the point X above or below an intermediate position Y on the path the ends of the rubber sandwich approach. The position Y is below the normal static load position and is the position at which the instantaneous direction of the point X is parallel to the end plates 13. At the normal static load position the instantaneous direction of relative motion of the point X is indicated by the arrow 46. The ends of the rubber sandwich are inclined at a small angle $a$ to the instantaneous direction of relative motion 46. This angle varies slightly for deflections under other static loads above and below the normal static load position selected, but remains small. The inclination of the ends of the rubber sandwich causes vertical loads to be borne by the rubber in both compression and shear and the curved path causes the compressive element of this loading to increase progressively with increase of deflection in each direction. An approximation to constant periodicity may be obtained over a reasonable range of deflections about the normal static load position and very large dynamic deflections are very stiffly resisted so that buffers are not required.

In a vertically spaced link suspension, such as this, the top link is only very lightly loaded. The lower link carries the greater load but in the present embodiment the reaction of the spring ensures that the link 4 is loaded in tension only so that it may be designed as a tie only and can, therefore be more simple and lighter than a strut or a member having to cater for more complex loads.

Figure 4:
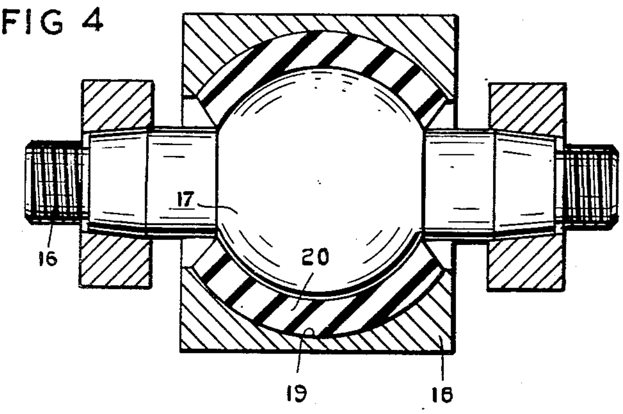
Figure 4 is a sectional elevation of one of the pivotal connecting elements of the linkage shown in Figures 1 to 3.

It will be seen that on deflection of the linkage from its normal static load position the wheel hub carrying member, in addition to moving in a plane perpendicular to the axes of the pivots at the ends 5 and 6 also moves in an arc about the pivotal connection 15 between the rigid torque arm 7 and the vehicle chassis 2. It is, therefore, necessary for the connection 15 and at least three of the pivotal connections between the links 3 and 4 and the wheel hub carrying member 1 and the chassis 2 to be capable of accommodating rotary movement in two directions. Figure 4 shows a connecting element suitable for this purpose.

In Figure 4 a pivot pin 16 has an enlarged part spherical portion 17 at its centre. An outer sleeve 18 arranged coaxially with the pivot pin has a complementary hollow part spherical portion 19 but of greater radius than the portion 17 of the pivot pin 16. The space between the two part spherical portions is filled by a rubber element 20 which is preferably bonded to the pivot pin 16. An outer sleeve 18 has an external cylindrical form to suit an eye formed in one member which is to be connected to another member by the pivot. The outer sleeve 18 is preferably split on radial planes into three or four sectors and the arrangement is such that the outer sleeve must be contracted to precompress the rubber on assembly in the eye provided for it.

This construction enables the pivot pin and the sleeve 18 to rotate relatively to each other and with very little resistance for a limited amount in any direction about the centre of the part spherical portions 17 and 19.

In the suspension system shown in Figures 1 to 3, connecting elements similar to that shown in Figure 4 are utilised at the connection of the links 3 and 4 and the torque arm 7 to the vehicle chassis, and of the upper link 3 to the wheel hub carrying member 1. In this embodiment it is inconvenient to employ a connecting element of the type shown in Figure 4 at the connection between the lower links 4 and the wheel hub carrying member, a cylindrical bonded rubber bush preferably according to British Patent Number 581464 being employed. With this arrangement rotation of the links 4 about the pivotal connection 15 between the arm 7 and the chassis 2 is accommodated at the inner end of the links, any slight remaining geometrical error being easily accommodated by bending of the links 4.

The rubber sandwich 8 is manufactured with rubber blocks 9 of rhomboidal cross section in a plane perpendicular to the axes of the pivots between the links 3 and 4 and the chassis 2, and the total length of the spring is made somewhat greater than the distance between the abutments 11 and 12 in the mean position of the linkage, as shown by chain-dotted line 47 in Figure 1. The rubber sandwich has to be considerably stressed in shear and compression in order to assemble it in the linkage. The amount of stress required is determined by the manufactured shape of the rubber sandwich so that in any deflected position of the linkage the sandwich will always be stressed in compression and in shear in the same direction, thereby avoiding fatigue-producing stress reversals.

Figure 5:
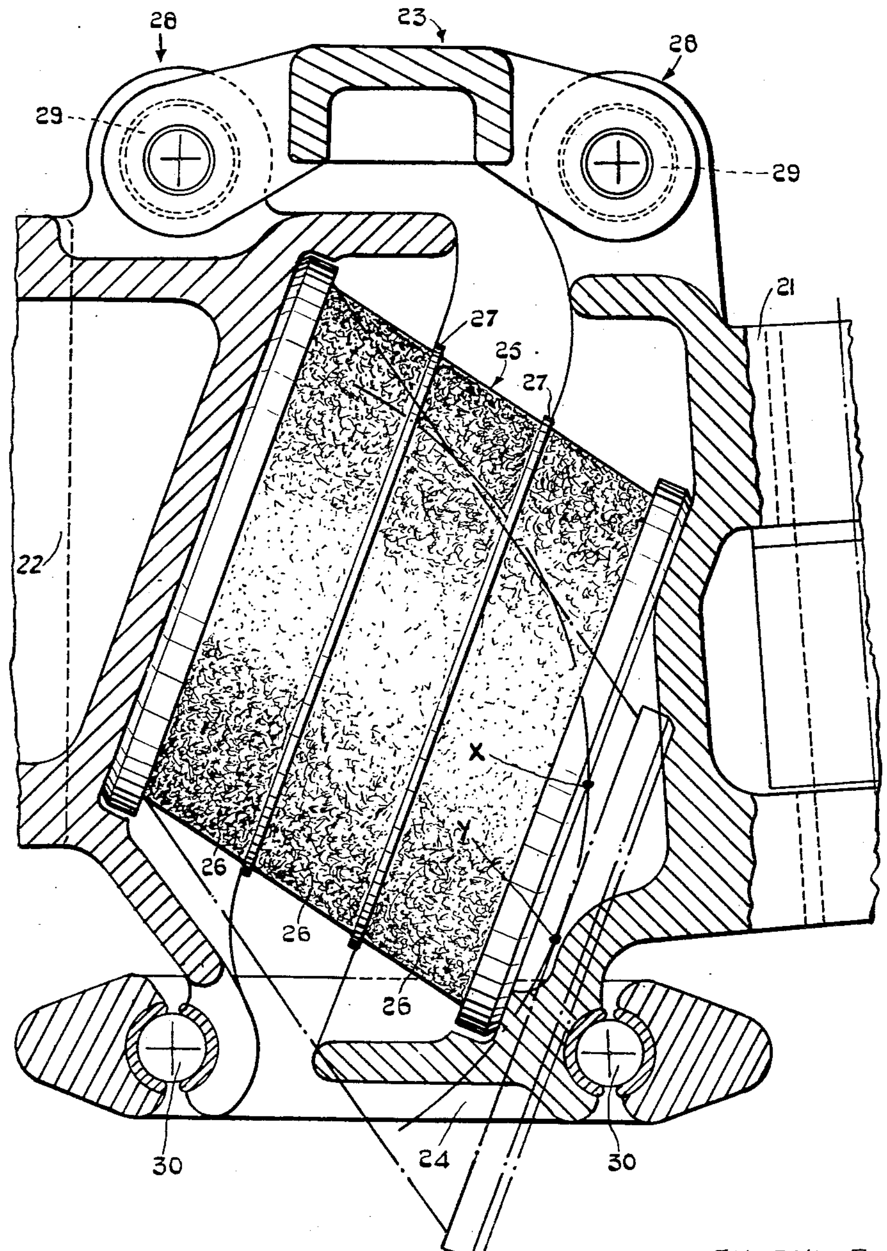
Figure 5 is a sectional elevation of a further form of independent suspension according to the invention.

Figure 5 shows an independent suspension arrangement of the "parallel linkage" type. A wheel hub carrying member 21 is connected to a vehicle chassis member 22 by upper and lower swinging wishbone links 23 and 24 respectively. A rubber spring 25, comprising alternate rubber blocks 26 and nonresilient interleaves 27 bonded together, is interposed between the wheel hub carrying member 21 and the chassis member 22.

The rubber spring or sandwich 25 is manufactured with rubber blocks 26 of rhomboidal cross section in a plane perpendicular to the axes of the pivots of the links 23 and 24, and when undeflected is of the shape indicated by chain dotted lines in, Figure 5. The spring 25 is thus considerably stressed in shear and compression when assembled in the linkage in the normal static load position shown. The amount of compression and shear required for this assembly is determined by the manufactured shape of the spring so that in any deflected position of the linkage the spring is always stressed in the same direction.

The pivots 28 between the upper link 23 and the chassis member 22 and the wheel hub carrying member 21 are formed by bushes 29 of the type in which an annular rubber element, bonded to inner and outer metal sleeves, is interposed between a hinge pin secured to one member, such as the upper link 23, and a hinge eye formed in the other member, such as the chassis member 22 or the wheel hub carrying member 21. The bushes 29 are preferably of the type described in British Patent Number 581,464 in which the inner sleeve is expanded or the outer sleeve contracted after bonding to the rubber in order to compress the rubber element radially.

The lower link 24 is connected to the wheel hub carrying member 21 and the chassis member 22 by floating roller hinges 30 each comprising opposed hollow seating members, a hinge pin between the seating members and rubber between the hinge pin and each of the seating members.

The hinge pins or rollers 30 are cylindrical. Rubber is bonded to the cylindrical surface of each and engages part cylindrical seating surfaces formed on the members 21 and 22. The rubber 31 has longitudinal gaps corresponding to the gaps between the seating surfaces. Rubber is also bonded on the end faces of the rollers 30 which are partially overlapped at both ends by the link 24. The appreciable length of the floating roller hinge makes it very stiff radially and axially. Since the strain is shared between the two rubber elements 31 in each hinge torsional stiffness is low. All these properties are very desirable in independent suspension systems. Radial and axial stiffness of the hinges ensures that the road wheel moves only in the planes in which it is deigned to move under spring action. The torsional stiffness should be as small as possible to avoid increasing the overall stiffness of the suspension. The rubber elements 31 are maintained under compression in all deflected positions of the linkage by the compression of the rubber spring 25 to maintain positive connection between the members 21 and 22 and the link 24.

As in the previously described embodiment a point X on the end plate engaging the seating surface on the member 21 has a curved path indicated by the chain-dotted line through the point X.

A progressive increase in spring rate in the "bump" direction is derived from the swinging links which increase the compression loading on the rubber spring and to such an extent on over-travel that separate buffer steps are normally unnecessary but may be added if they are considered desirable. By suitably proportioning the components of the linkage and the rubber spring an approximation to constant periodicity can be obtained for limited travel on each side of the normal static load position. Since the spring bearing surfaces are inclined to the instantaneous direction of motion of the point X in the normal static load position, this load is borne in compression and shear. Bump or upward deflections are borne with an increasing element of compressive resistance. There is actually a decrease in spring rate in the rebound direction until the links are normal to the bearing surfaces when the point X reaches the intermediate position Y on the curved path. On further movement in the rebound direction the spring rate begins to increase again.

As a floating roller hinge is used for the lower wishbone link the rubber springs must be pre-compressed to an extent such that the load on this link is maintained in tension during the initial rebound movement.

In Figures 6 and 7 one link of a further embodiment of the invention is shown. A link 32 comprising two symmetrical castings or forgings 33 bolted or secured together at their symmetrical interfaces 34 (one casting or forging 33 only is shown) is connected by pivots or hinges 35 to a bracket 36 for securing to a vehicle chassis, and has at its end remote from the hinges 35 a housing 37 for connection to a wheel hub carrying member (not shown). The link may be used in conjunction with means for guiding the path of deflection of the wheel hub carrying member, such as a further link parallel to, and above or below the link 32.

Rubber springs 38 comprising alternate rubber blocks 39 bonded to non-resilient interleaves 40 is interposed between abutments 41 and 42 respectively on the bracket 36 and the link members 33. The ends of the springs are secured, for example by bolting, to the abutments 41 and 42. As in the previous examples, the rubber blocks are of rhomboidal cross-section in the undeflected condition, so that when assembled in the linkage they are stressed in shear and compression to the shape shown.

The hinges 35 between the link 32 and the bracket 36 are of the floating roller type according to British Patent 714,074 as in the embodiment shown in Figure 5. Rubber is bonded to hinge pins or rollers 43 and engages part spherical seatings formed on the members 33 of the link 32 and to the chassis member 36. The rubber 44 has longitudinal gaps corresponding to the gaps between the seatings. The rubbber elements 44 are maintained in substantially radial compression by the compression of the rubber springs 38. The principal axis of compression being perpendicular to the mounting surfaces of the abutments 41 and 42, is arranged to be substantially perpendicular to the plane through the longitudinal gaps in the rubber so that the stress distribution in each rubber element is substantially symmetrical about this principal axis.

An advantage of this construction is that the bracket 36, the hinges 35 and the spring 38 are mostly contained within the wishbone link 32, thus reducing the overall height of the wishbone assembly, and making it easy to provide adequate ground clearance. The components are also largely enclosed and protected from mechanical damage. For further protection a detachable cover plate 45 may be fitted to the lower part of the link to protect the rubber elements from mechanical damage, for example by flying stones.

Although in Figures 6 and 7 the link 32 comprises two symmetrical castings or forged members 33, nonsymmetrical members may be used in other embodiments to make up links of similar type to the link 32.

Figure 8:
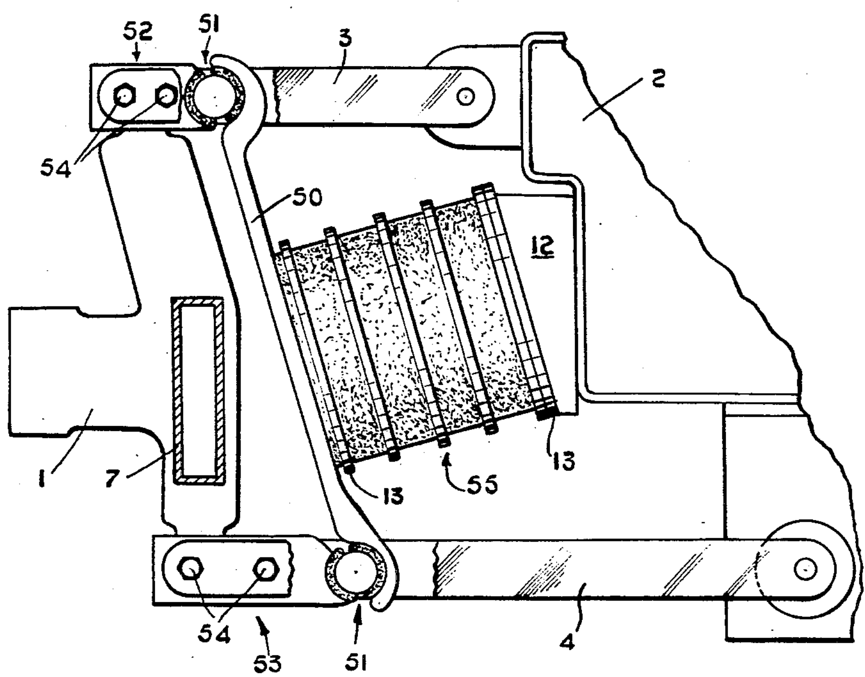
Figure 8 is a diagrammatic elevation of a modification of the independent suspension shown in Figure 1.

In the modification shown in Figure 8 of the embodiment of Figures 1 to 3 the components similar to those in Figure 1 are given similar references. A member 50 spans the links 3 and 4 and is pivotally connected to them by floating roller hinges 51 as in Figure 5 according to British Patent 714,074.

A seating for the roller hinge 51 is provided on housings for ball and socket joints 52, 53 at the upper and lower ends respectively of the hub carrying member 1 and secured to the links 3 and 4 by bolts 54. The member 50 provides the abutment for the end of the rubber sandwich 55 which is secured to the linkage and transfer the load due to the reaction of the spring to the links 3 and 4 through the hinges 51. The ball and socket joints 52, 53 are thus relieved of this load and may be designed accordingly.

A member such as 50 to bear the reaction of the rubber spring may also be usefully employed in suspension systems in which ball and socket joints combine the function of swivel pins for steerable wheel and hinged joints of the suspension linkage.

Where the rubber spring has a constraining arm, such as the arm 14 in the embodiments of Figures 1 to 3 adjustment may be required between the arm and its pivotal connection to the linkage. Figure 9 shows one suitable form of adjusting means. A constraining arm 56 has slotted holes 57 to receive and provide adjustment for securing bolts 58 for a bearing block 59 in which a rubber bush 60 is housed. The rubber bush 60 forms the pivotal connection to a component 61 of the wheel suspension linkage having a similar vertical movement to the point in the rubber spring at which the constraining arm 56 is provided. The component 61 may for example be a link such as the link 3 in Figure 1.

Instead of providing adjusting means for allowing for vertical movement of the constraining arm 56 relative to the linkage component 61 a constraining link may be employed as shown in Figure 10. The constraining link 62 is pivotally connected by a rubber bush 63 to the constraining arm 56 at one end and at the other by a rubber bush 64 to the linkage component 61. If desired the constraining arm 56 may be extended on the opposite sides of the rubber spring and be connected to two linkage components such as the top and bottom links 3 and 4 in Figure 1. Furthermore by suitably proportioning the constraining link 62 and its arrangement to obtain suitable movement the constraining arm 56 may be tied to some other part of the linkage or to the vehicle superstructure.

The embodiment shown in Figures 6 and 7 is most suitable for use where the wheel is required to have a large deflection, since the deflection of the rubber spring 38 is only small in comparison with the deflection of the wheel carrier housing 37. The rubber blocks 39 in this arrangement can thus be made of stiffer rubber than those of the other embodiments without making the suspension unduly stiff. In the other embodiments the deflection of the spring is substantially the same as that of the wheel carrying member, and consequently a softer mix of rubber must be used for the springs. The linkage shown in Figure 5 is designed for suspension systems in which only a small deflection is required, such as a gun carriage.

In the embodiment of Figures 1 to 3, however, the deflection is substantially larger, and consequently a longer spring is required, and the tendency for the interleaves to cant must be counteracted by the arm 14.

In the embodiments shown in Figure 5 and Figures 6 and 7 and Figure 8 in which the floating roller hinges according to British Patent 714,074 are used, the resultant compressive force on each hinge in the full static loaded position is arranged to be perpendicular to the plane through the longitudinal gaps in the rubber elements. There is thus no force under static load tending to move one part cylindrical seating of a hinge relative to another in this plane. Each floating rubber hinge is so heavily loaded radially in compression that there is no possibility that it can become unloaded in use even on rebound.

Suitable values, by way of example only, for the small angle between the plane of the mounting plate or abutment on the vehicle superstructure and the direction of relative motion between the ends of the rubber sandwich in a normal static load position may be given as between 12° and 20° in the embodiments described in this specification.

Where rubber bonded hinges are shown in these embodiments it will be understood that other types of hinges are possible such as shackle links or metal bearings such as the screw type, or ball and socket joints in appropriate parts of the linkages.

I claim:

1. Independent suspension for connecting a vehicle wheel to a vehicle superstructure comprising a wheel hub carrying member, linkage means including said wheel hub carrying member and connecting means hinged to the wheel hub carrying member and to the superstructure and adapted to permit and guide deflection of the wheel hub carrying member relative to the superstructure of the vehicle, mounting abutments on the superstructure and on a part of the linkage means movable with respect to the superstructure, a rubber sandwich interposed between the mounting abutments, and having rubber blocks separated by and bonded to interleaves, and at least one constraining arm secured to one of the interleaves, and anchored at its outer end to the linkage so as to remain substantially parallel to the mounting abutment on the superstructure, the end plates of the rubber sandwich being rigidly secured to the respective mounting abutments and the plane of the mounting abutment on the vehicle superstructure being inclined at a small angle to the vertical.

2. Independent suspension according to claim 1 wherein the constraining arm is pivotally connected to a part of the linkage which has a similar vertical component of its movement to the interleaf to which the constraining arm is secured.

3. Independent suspension according to claim 2 wherein the constraining arm is adjustable relative to its pivotal connection to the linkage.

4. Independent suspension according to claim 1 wherein the constraining arm is pivotally connected to a constraining link which in turn is pivotally connected to an anchorage on said linkage.

5. Independent suspension for connecting each wheel of an opposed pair of vehicle wheels to a vehicle superstructure having a longitudinal axis for movement of the wheel independently of the other wheel of the pair comprising a wheel hub-carrying member, transverse linkage means including said wheel hub carrying member and connecting means hinged to the wheel hub carrying member and to the superstructure about axes of rotation substantially parallel to said longitudinal axis and adapted to permit and guide deflection of the wheel hub carrying member relative to the superstructure of the vehicle, mounting abutments on the superstructure and on a part of the linkage means movable with respect to the superstructure, a rubber sandwich interposed between the spring mounting abutments, the rubber sandwich being composed of rubber blocks interposed between and bonded to end plates and having interleaves between and bonded to the rubber blocks to increase the stiffness in compression, the ends of the rubber sandwiches in the free state of the sandwich before assembly being considerably offset by the use of rubber blocks of rhomboidal cross-section in a plane perpendicular to the ends, the whole sandwich before assembly thereby having a rhomboidal cross-section in said plane and when assembled between the spring mounting abutments being considerably stressed in both compression and shear, the end plates of the rubber sandwich being rigidly secured to the respective mounting abutments and the mounting abutment on the vehicle superstructure being inclined at a small angle to the vertical, said spring mounting abutments for the rubber sandwich on the vehicle superstructure comprising a wedge interposed between the end of the rubber sandwich and a substantially vertical surface on the vehicle superstructure upon which the wedge is adjustable vertically to vary the height of the rubber sandwich at that end and so the relationship between the components of the linkage for a given loading.

6. Independent suspension for connecting each wheel of an opposed pair of vehicle wheels to a vehicle superstructure for movement of the wheel independently of the other wheel of the pair, comprising a wheel hub carrying member, transverse linkage means including said wheel hub carrying member and connecting means hinged about substantially longitudinal axes to the wheel hub carrying member and to the superstructure and adapted to permit and guide deflection of the wheel hub carrying member relative to the superstructure of the vehicle, mounting abutments on and rigid with the superstructure and on and rigid with a part of the linkage means movable with respect to the superstructure, the mounting abutment on the superstructure being located at a higher elevation than the mounting abutment on the linkage and a rubber sandwich interposed between the spring mounting abutments, the ends of the rubber sandwich being rigidly secured to the respective mounting abutments and the plane of the mounting abutment on the vehicle superstructure being inclined at a small angle to the vertical, a torque arm rigidly secured to the wheel hub carrying member, and extending from it substantially longitudinally with respect to the vehicle, connecting means for permitting limited universal angular movement of the torque arm and for anchoring the end of the torque arm remote from the wheel hub carrying member to the superstructure of the vehicle, the pivotal connections between the linkage and the hub carrying member and between the linkage and the vehicle superstructure including joint means for permitting limited universal angular movement at the pivotal connection.

7. Independent suspension according to claim 6 in which said joint means comprises at least three pivotal connections between the linkage and the hub carrying member and between the linkage and the vehicle superstructure, said joint means and said connecting means each being formed by a hinge pin secured in each case to the first of the members connected together, the hinge pin having a central part-spherical portion bonded to a rubber element which is contained in an outer sleeve secured to the second member, the pivot pin thereby being rotatable a limited amount in any direction relative to the outer sleeve about the centre of the part-spherical portion.

References Cited in the file of this patent

UNITED STATES PATENTS

| | | |
|---|---|---|
| 1,990,016 | Alden et al. | Feb. 5, 1935 |
| 2,166,880 | Schuh et al. | July 18, 1939 |
| 2,197,727 | Ledwinka | Apr. 16, 1940 |
| 2,212,769 | Boxan | Aug. 27, 1940 |
| 2,225,966 | Beemer | Dec. 24, 1940 |
| 2,334,702 | Newton et al. | Nov. 23, 1943 |
| 2,704,664 | Hickman | Mar. 22, 1955 |

FOREIGN PATENTS

| | | |
|---|---|---|
| 466,341 | Great Britain | May 26, 1937 |
| 496,035 | Great Britain | Nov. 23, 1938 |
| 509,177 | Great Britain | July 12, 1939 |
| 545,704 | Great Britain | June 9, 1942 |
| 648,516 | Great Britain | Jan. 3, 1951 |